United States Patent
Jinmei et al.

(10) Patent No.: US 7,373,426 B2
(45) Date of Patent: May 13, 2008

(54) NETWORK SYSTEM USING NAME SERVER WITH PSEUDO HOST NAME AND PSEUDO IP ADDRESS GENERATION FUNCTION

(75) Inventors: Tatuya Jinmei, Kanagawa (JP);
Masahiro Ishiyama, Kanagawa (JP);
Yuzo Tamada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 919 days.

(21) Appl. No.: 10/401,875

(22) Filed: Mar. 31, 2003

(65) Prior Publication Data

US 2005/0076139 A1    Apr. 7, 2005

(30) Foreign Application Priority Data

Mar. 29, 2002  (JP) ............................. 2002-097912

(51) Int. Cl.
*G06F 15/16* (2006.01)
(52) U.S. Cl. .................. 709/245; 709/226; 707/6; 707/10; 707/104.1; 726/5; 726/6; 726/7
(58) Field of Classification Search .......... 709/226, 709/245; 707/6, 10, 104.1; 726/5, 6, 7
See application file for complete search history.

(56) References Cited

U.S. PATENT DOCUMENTS

| | | | | |
|---|---|---|---|---|
| 5,159,592 A | * | 10/1992 | Perkins | 370/338 |
| 5,884,038 A | * | 3/1999 | Kapoor | 709/226 |
| 5,898,830 A | * | 4/1999 | Wesinger et al. | 726/15 |
| 6,049,826 A | * | 4/2000 | Beser | 709/222 |
| 6,249,813 B1 | * | 6/2001 | Campion et al. | 709/222 |
| 6,298,341 B1 | * | 10/2001 | Mann et al. | 707/3 |
| 6,578,088 B2 | * | 6/2003 | Ohno et al. | 709/245 |
| 6,614,774 B1 | * | 9/2003 | Wang | 370/338 |
| 6,944,661 B2 | * | 9/2005 | Moore et al. | 709/225 |
| 2004/0083306 A1 | * | 4/2004 | Gloe | 709/245 |

FOREIGN PATENT DOCUMENTS

JP    2001-156843    6/2001

OTHER PUBLICATIONS

Droms, R., "RFC 2131 Dynamic Host Configuration Protocol", IETF Request for comments, Mar. 1997, whole document.*
P. Vixie, et al. "Dynamic Updates in the Domain Name System (DNS Update)," Request for Comments 2136, Apr. 1997, pp. 1-26.
P. Mockapetris, IETF Request for Comments, XP-002917155, pp. 1-39, "RFC 1035 Domain Names-Implementation and Specification", Feb. 13, 1996.
P. Mockapetris, IETF Request for Comments, XP-002278155, pp. 1-55, RFC 1034 Domain Names-Concepts and Facilities, Nov. 1987.
R. ELZ, IETF Request for Comment, XP-002278156, pp. 1-15, "RFC 2181 Clarifications to the DNS Specification", Jul. 1997.

* cited by examiner

*Primary Examiner*—Bunjob Jaroenchonwanit
*Assistant Examiner*—Thomas J Dailey
(74) *Attorney, Agent, or Firm*—Oblon, Spivak, McClelland, Maier & Neustadt, P.C.

(57) ABSTRACT

The host name to be used in responding to the reverse look-up request from the correspondent is generated at the name server side and returned as a response, and/or the IP address to be used in responding to the normal look-up request from the correspondent is generated at the name server side and returned as a response, so that the communications can be carried out without exposing the privacy of the communication host or the user to danger.

1 Claim, 12 Drawing Sheets

NETWORK SYSTEM USING NAME SERVER WITH PSEUDO HOST NAME AND PSEUDO IP ADDRESS GENERATION FUNCTION

BACKGROUND OF THE INVENTION

1. Field of the Invention

The present invention relates to a name server for processing a reverse look-up request, a name server for processing a normal look-up request, a network system, a reverse look-up request processing method, a normal look-up request processing method, and a communication control method.

2. Description of the Related Art

In recent years, in conjunction with the spread of the constant access to the Internet even at general homes, the privacy issue is attracting attentions. For example, increasingly many people are concerned about the leakage of the privacy of the communication device (communication node) or the user who is using it by using the IP address as a key.

In particular, in the IPv6 environment in general, a specific prefix is assigned to the upper 64 bits from the ISP side, and a unique number is assigned to the lower 64 bits by the interface on the communication node side. In this way, when the communications are eavesdropped for a prescribed period of time by the malicious third person, it is not so difficult to identify that communication node.

In order to deal with demands for such a privacy protection, there is a proposition for randomly changing the lower 64 bits of the IPv6 address defined by RFC 3041 or the like.

In the case of using such a method for randomly changing the IP address, it is not customary to register RR (Resource Record) for the reverse look-up corresponding to this IP address (the reverse look-up is a procedure to obtain the host name from the IP address). This is because if the RR is registered into the name server of the DNS such that the host name can be obtained by the reverse look-up from a particular IP address, there is a problem that the IP address can be revealed at some specific timing from the host name even when the IP address is randomly changed, so that the privacy cannot be protected.

However, there are servers which regard the correspondent that attempted an access as a non-trustworthy communication node and do not permit an access from that communication node, when the reverse look-up or the normal look-up of the IP address from which the access is attempted is carried out and failed.

Also, there is a method for dynamically registering the host name that is automatically generated by using the dynamic update function of the DNS, but it is difficult to operate the DNS by accurately authenticating the dynamic update function.

Apart from these problems, there are servers which regard the correspondent that attempted an access as a non-trustworthy communication node and do not permit an access from that communication node, when the reverse look-up or the normal look-up of the IP address from which the access is attempted is carried out and failed. For this reason, the use of a random IP address as a default source address is not recommended in general.

Note that the details of the source address selection and the destination address selection under the IPv6 environment can be found in the IETF Internet draft "draft-ietf-ipngwg-default-addr-select-07.txt".

As described, in the prior art, it has been impossible to protect the privacy of the communication node or the user sufficiently because of the leakage from the IP address. Also, in the method using a random IP address as a source address, the privacy protection can be realized but there are also problems such as that the connectivity cannot be guaranteed.

BRIEF SUMMARY OF THE INVENTION

It is therefore an object of the present invention to provide a name server, a network system, a reverse look-up request processing method, a normal look-up request processing method and a communication control method capable of utilizing response from the name server for the access control while protecting the privacy of the communication node and the user.

According to one aspect of the present invention there is provided a name server for managing correspondence information that registers a host name corresponding to an IP address by using the IP address as a key, with respect to communication nodes belonging to a network of a prescribed range, the name server comprising: a reception unit configured to receive a reverse look-up request to which a host name corresponding to a specific IP address should be returned, from a request source node; a search unit configured to search through the correspondence information by using the specific IP address contained in the reverse look-up request as a key, when the reverse look-up request is received by the reception unit; a generation unit configured to generate a pseudo host name, when a host name corresponding to the specific IP address contained in the reverse look-up request is not obtained as a result of search by the search unit; and a transmission unit configured to return the host name corresponding to the specific IP address contained in the reverse look-up request to the request source node, when the host name corresponding to the specific IP address contained in the reverse look-up request is obtained as a result of search by the search unit, and return the pseudo host name generated by the generation unit to the request source node, when the host name corresponding to the specific IP address contained in the reverse look-up request is not obtained as a result of search by the search unit.

According to another aspect of the present invention there is provided a name server for managing correspondence information that registers an IP address corresponding to a host name by using the host name as a key, with respect to communication nodes belonging to a network of a prescribed range, the name server comprising: a reception unit configured to receive a normal look-up request to which an IP address corresponding to a specific host name should be returned, from a request source node; a search unit configured to search through the correspondence information by using the specific host name contained in the normal look-up request as a key, when the normal look-up request is received by the reception unit; a generation unit configured to generate a pseudo IP address, when an IP address corresponding to the specific host name contained in the normal look-up request is not obtained as a result of search by the search unit; and a transmission unit configured to return the IP address corresponding to the specific host name contained in the normal look-up request to the request source node, when the IP address corresponding to the specific host name contained in the normal look-up request is obtained as a result of search by the search unit, and return the pseudo IP address generated by the generation unit to the request source node, when the IP address corresponding to the specific host name contained in the normal look-up request is not obtained as a result of search by the search unit.

According to another aspect of the present invention there is provided a network system containing a first name server for managing first correspondence information that registers a host name corresponding to an IP address by using the IP address as a key, with respect to communication nodes belonging to a network of a prescribed range, and a second name server for managing second correspondence information that registers an IP address corresponding to a host name by using the host name as a key, with respect to the communication nodes belonging to the network of the prescribed range, wherein: the first name server has: a first reception unit configured to receive a reverse look-up request to which a host name corresponding to a specific IP address should be returned, from a request source node; a first search unit configured to search through the first correspondence information by using the specific IP address contained in the reverse look-up request as a key, when the reverse look-up request is received by the first reception unit; a first generation unit configured to generate a pseudo host name in one-to-one correspondence with the specific IP address according to the specific IP address, when a host name corresponding to the specific IP address contained in the reverse look-up request is not obtained as a result of search by the first search unit; and a first transmission unit configured to return the host name corresponding to the specific IP address contained in the reverse look-up request to the request source node, when the host name corresponding to the specific IP address contained in the reverse look-up request is obtained as a result of search by the first search unit, and return the pseudo host name generated by the first generation unit to the request source node, when the host name corresponding to the specific IP address contained in the reverse look-up request is not obtained as a result of search by the first search unit; and the second name server has: a second reception unit configured to receive a normal look-up request to which an IP address corresponding to a specific host name should be returned, from a request source node; a second search unit configured to search through the second correspondence information by using the specific host name contained in the normal look-up request as a key, when the normal look-up request is received by the second reception unit; a second generation unit configured to generate a pseudo IP address in one-to-one correspondence with the specific host name according to the specific host name, when an IP address corresponding to the specific host name contained in the normal look-up request is not obtained as a result of search by the second search unit; and a second transmission unit configured to return the IP address corresponding to the specific host name contained in the normal look-up request to the request source node, when the IP address corresponding to the specific host name contained in the normal look-up request is obtained as a result of search by the second search unit, and return the pseudo IP address generated by the second generation unit to the request source node, when the IP address corresponding to the specific host name contained in the normal look-up request is not obtained as a result of search by the second search unit; and a first conversion from the IP address into the pseudo host name by generating the pseudo host name according to the IP address by the first generation unit of the first name server and a second conversion from the host name into the pseudo IP address by generating the pseudo IP address according to the host name by the second generation unit of the second name server are set to be in a relationship of being an inverse conversion of each other.

According to another aspect of the present invention there is provided a method for reverse look-up request processing at a name server for managing correspondence information that registers a host name corresponding to an IP address by using the IP address as a key, with respect to communication nodes belonging to a network of a prescribed range, the method comprising: receiving a reverse look-up request to which a host name corresponding to a specific IP address should be returned, from a request source node; searching through the correspondence information by using the specific IP address contained in the reverse look-up request as a key, when the reverse look-up request is received; generating a pseudo host name, when a host name corresponding to the specific IP address contained in the reverse look-up request is not obtained as a result of search; and returning the host name corresponding to the specific IP address contained in the reverse look-up request to the request source node, when the host name corresponding to the specific IP address contained in the reverse look-up request is obtained as a result of search, and returning the pseudo host name generated by the generating step to the request source node, when the host name corresponding to the specific IP address contained in the reverse look-up request is not obtained as a result of search.

According to another aspect of the present invention there is provided a method for normal look-up request processing at a name server for managing correspondence information that registers an IP address corresponding to a host name by using the host name as a key, with respect to communication nodes belonging to a network of a prescribed range, the method comprising: receiving a normal look-up request to which an IP address corresponding to a specific host name should be returned, from a request source node; searching through the correspondence information by using the specific host name contained in the normal look-up request as a key, when the normal look-up request is received; generating a pseudo IP address, when an IP address corresponding to the specific host name contained in the normal look-up request is not obtained as a result of search; and returning the IP address corresponding to the specific host name contained in the normal look-up request to the request source node, when the IP address corresponding to the specific host name contained in the normal look-up request is obtained as a result of search, and returning the pseudo IP address generated by the generating step to the request source node, when the IP address corresponding to the specific host name contained in the normal look-up request is not obtained as a result of search.

According to another aspect of the present invention there is provided a method for communication control in a network system containing a first name server for managing first correspondence information that registers a host name corresponding to an IP address by using the IP address as a key, with respect to communication nodes belonging to a network of a prescribed range, a second name server for managing second correspondence information that registers an IP address corresponding to a host name by using the host name as a key, with respect to the communication nodes belonging to the network of the prescribed range, a communication node belonging to the network of the prescribed range, and a correspondent node belonging to external of the network of the prescribed range which becomes a correspondent of the communication node, the method comprising: transmitting a connection request from the communication node to the correspondent node; receiving the connection request from the communication node at the correspondent node, and transmitting a reverse look-up request to which a host name corresponding to a specific IP address of the communication node should be returned, from the correspondent node to the first name server; receiving the reverse look-up request to which a host name corresponding to the specific IP address should be returned, from the correspondent node at the first name server; searching through the first correspondence information by using the specific IP address contained in the reverse look-up request as a key, at the first name server; generating a pseudo host name in one-to-one correspondence with the specific IP address according to the specific IP address, when a host name corresponding to the specific IP address contained in the reverse look-up request is not obtained as a result of search, at the first name server; returning the pseudo host name to the correspondent node from the first name server; receiving the pseudo host name from the first name server at the correspondent node, and transmitting a normal look-up request to which an IP address corresponding to the pseudo host name should be returned, from the correspondent node to the second name server; receiving the normal look-up request to which an IP address corresponding to the pseudo host name should be returned, from the correspondent node at the second name server; searching through the second correspondence information by using the pseudo host name contained in the normal look-up request as a key, at the second name server; generating a pseudo IP address in one-to-one correspondent with the pseudo host name according to the pseudo host name, when an IP address corresponding to the pseudo host name contained in the normal look-up request is not obtained as a result of search, at the second name server; returning the pseudo IP address to the correspondent node from the second name server; and receiving the pseudo IP address from the second name server, comparing the pseudo IP address received from the second name server and the specific IP address of the communication node, and permitting the connection request of the communication node when the pseudo IP address received from the second name server and the specific IP address of the communication node coincide, or refusing the connection request of the communication node when the pseudo IP address received from the second name server and the specific IP address of the communication node do not coincide, at the correspondent node.

According to another aspect of the present invention there is provided a method for communication control in a network system containing a name server for managing correspondence information that registers a host name corresponding to an IP address by using the IP address as a key, with respect to communication nodes belonging to a network of a prescribed range, a communication node belonging to the network of the prescribed range, and a correspondent node belonging to external of the network of the prescribed range which becomes a correspondent of the communication node, the method comprising: transmitting a connection request from the communication node to the correspondent node; receiving the connection request from the communication node at the correspondent node, and transmitting a reverse look-up request to which a host name corresponding to a specific IP address of the communication node should be returned, from the correspondent node to the name server; receiving the reverse look-up request to which a host name corresponding to the specific IP address should be returned, from the correspondent node at the name server; searching through the correspondence information by using the specific IP address contained in the reverse look-up request as a key, at the name server; generating a pseudo host name, when a host name corresponding to the specific IP address contained in the reverse look-up request is not obtained as a result of search, at the name server; and returning the pseudo host name to the correspondent node from the name server; permitting the connection request of the communication node when the pseudo host name is received from the name server, or refusing the connection request of the communication node when information indicating an error is received from the name server, at the correspondent node.

According to another aspect of the present invention there is provided a computer program product for causing a computer to function as a name server for managing correspondence information that registers a host name corresponding to an IP address by using the IP address as a key, with respect to communication nodes belonging to a network of a prescribed range, the computer program product comprising: a first computer program code for causing the computer to receive a reverse look-up request to which a host name corresponding to a specific IP address should be returned, from a request source node; a second computer program code for causing the computer to search through the correspondence information by using the specific IP address contained in the reverse look-up request as a key, when the reverse look-up request is received by the first computer program code; a third computer program code for causing the computer to generate a pseudo host name, when a host name corresponding to the specific IP address contained in the reverse look-up request is not obtained as a result of search by the second computer program code; and a fourth computer program code for causing the computer to return the host name corresponding to the specific IP address contained in the reverse look-up request to the request source node, when the host name corresponding to the specific IP address contained in the reverse look-up request is obtained as a result of search by the second computer program code, and return the pseudo host name generated by the third computer program code to the request source node, when the host name corresponding to the specific IP address contained in the reverse look-up request is not obtained as a result of search by the second computer program code.

According to another aspect of the present invention there is provided a computer program product for causing a computer to function as a name server for managing correspondence information that registers an IP address corresponding to a host name by using the host name as a key, with respect to communication nodes belonging to a network of a prescribed range, the computer program product comprising: a first computer program code for causing the computer to receive a normal look-up request to which an IP address corresponding to a specific host name should be returned, from a request source node; a second computer program code for causing the computer to search through the correspondence information by using the specific host name contained in the normal look-up request as a key, when the normal look-up request is received by the first computer program code; a third computer program code for causing the computer to generate a pseudo IP address, when an IP address corresponding to the specific host name contained in the normal look-up request is not obtained as a result of search by the second computer program code; and a fourth computer program code for causing the computer to return the IP address corresponding to the specific host name contained in the normal look-up request to the request source node, when the IP address corresponding to the specific host name contained in the normal look-up request is obtained as a result of search by the second computer program code, and return the pseudo IP address generated by the third computer program code to the request source node, when the IP address corresponding to the specific host name contained in the normal look-up request is not obtained as a result of search by the second computer program code.

Other features and advantages of the present invention will become apparent from the following description taken in conjunction with the accompanying drawings.

DETAILED DESCRIPTION OF THE INVENTION

Referring now to FIG. 1 to FIG. 15, one embodiment of the present invention will be described in detail.

Figure 1:
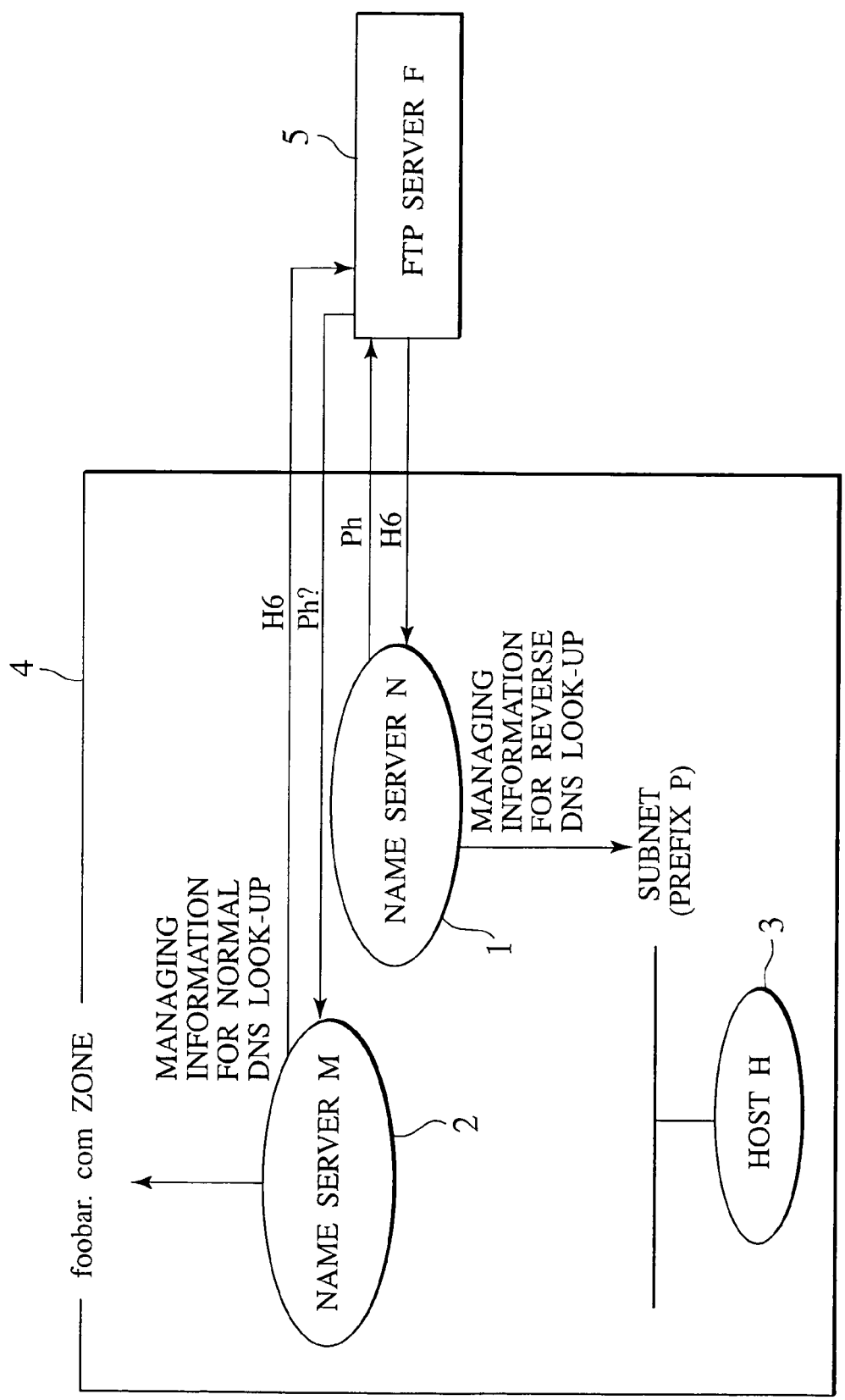
FIG. 1 is a schematic diagram showing an exemplary configuration of a network system according to one embodiment of the present invention.

FIG. 1 shows an exemplary configuration of a network system according to one embodiment of the present invention.

Usually, the zone at the DNS often contains a plurality of subnets, but here for the sake of simplicity of the description, a "foobar.com" zone shown in FIG. 1 is assumed to be a zone that manages one subnet.

A name server 1 (which will be referred to as a name server N hereafter) is a name server for managing DNS reverse look-up information (information that registers a corresponding host name, using the IPv6 address as a key) for the purpose of the reverse look-up (a procedure to obtain the corresponding host name from the IP address) inside the subnet, and a name server 2 (which will be referred to as a name server M hereafter) is a name server for managing DNS normal look-up information (information that registers a corresponding IPv6 address, using the host name as a key) for the purpose of the normal look-up (a procedure to obtain the corresponding IP address from the host name) inside the sub-net.

The reverse look-up name server N and the normal look-up name server M can be provided as separate devices, or can be provided as a single device. Here, for the sake of explanation, the exemplary case of providing them as separate devices will be described.

This subnet is assumed to have the following IPv6 prefix:

$3ffe:ffff:1234:abcd::/64$

Also, the organization of this subnet is assumed to have the authority with respect to the following reverse look-up DNS zone corresponding to this prefix.

$d.c.b.a.4.3.2.1.f.f.f.f.e.f.f.3.ip6.arpa.$

Figure 3:
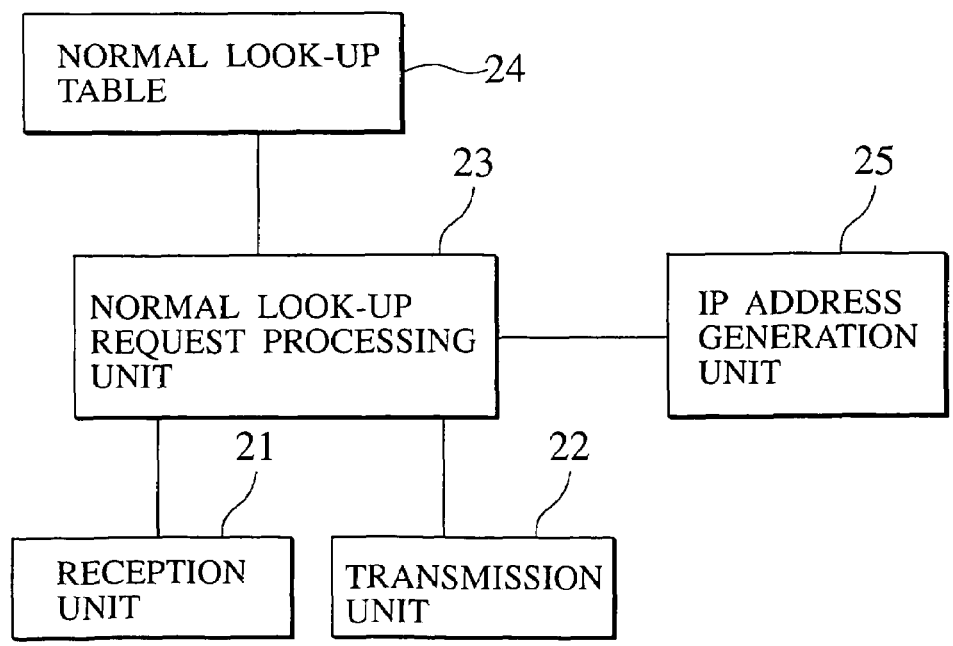
FIG. 3 is a block diagram showing an exemplary configuration of a name server for normal look-up according to one embodiment of the present invention.

Next, in FIG. 3, a host 3 (communication node) (which will be referred to as a host H hereafter) is a host connected to this subnet. Note that the host H is typically a computer, but it is not necessarily limited to this case, and can be a portable telephone terminal or an information home electronics terminal, etc., which is capable of accessing the Internet through a plurality of Internet service providers.

Here, the IPv6 address assigned to the host H is assumed to be:

$3ffe:ffff:1234:abcd:7550:f6b8:7d9d:ad7f$

In this case, the DNS RR for the reverse look-up corresponding to this IPv6 address is:

$f.7.d.a.d.9.7.8.b.6.f.0.5.5.7.d.c.b.a.4.3.2.1.f.f.f.f.$
$e.f.3.1p6.arpa.$

Here, however, if the DNS RR for the reverse look-up is registered in the name server N, there is a possibility for leaking the privacy along with that address, so that it is assumed here that the DNS RR is not registered.

Figure 5:
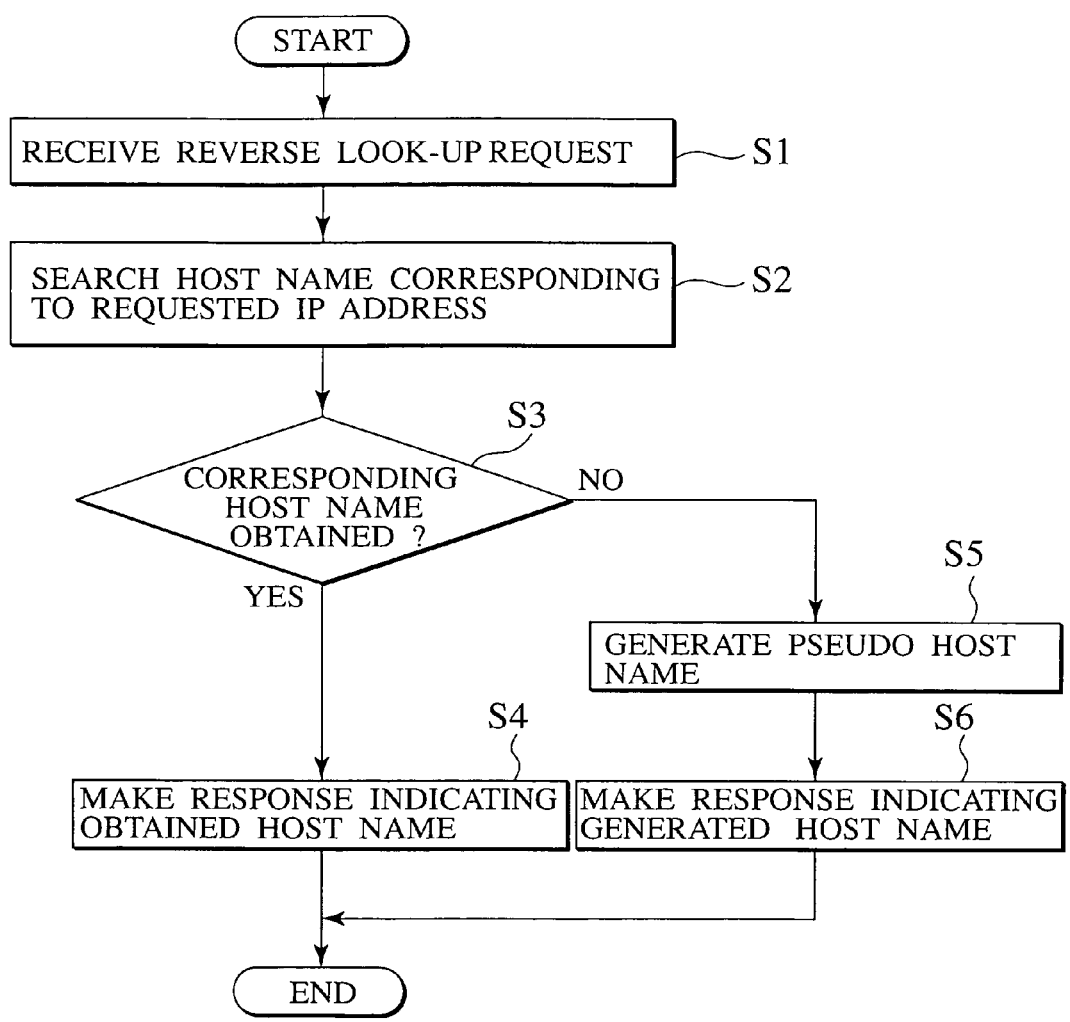
FIG. 5 is a flow chart showing one exemplary processing procedure of a name server for reverse look-up according to one embodiment of the present invention.

Next, in FIG. 5, an FTP server 5 (which will be referred to as an FTP server F hereafter) is one example of a correspondent of the host H. The FTP server F is assumed to be existing outside of the "foobar.com" zone. Note that the correspondent of the host H can be a server other than the FTP server or a communication of a type other than the server.

Figure 2:
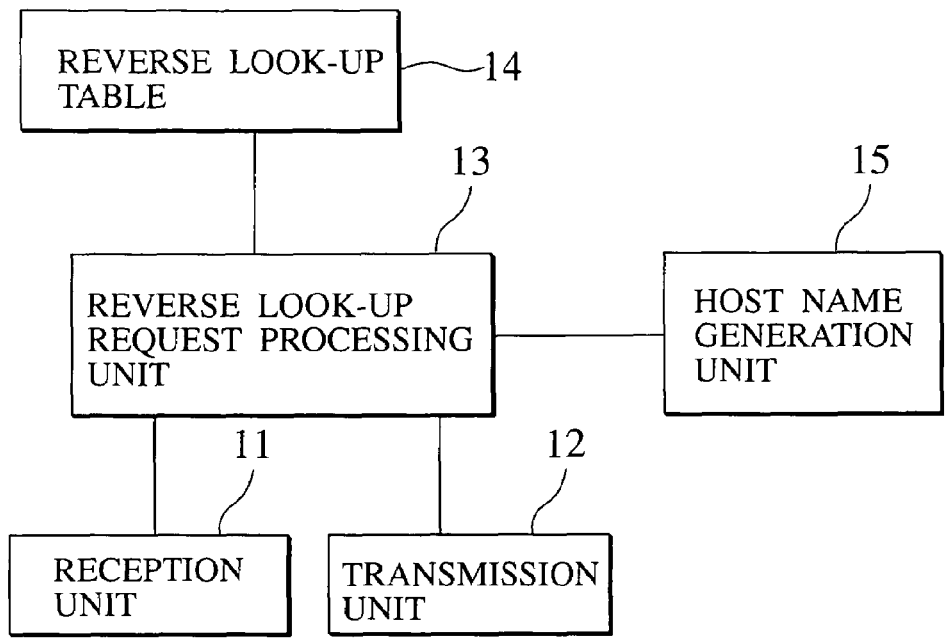
FIG. 2 is a block diagram showing an exemplary configuration of a name server for reverse look-up according to one embodiment of the present invention.

FIG. 2 shows an exemplary configuration of the name server N for managing the DNS reverse look-up information according to one embodiment of the present invention.

As shows in FIG. 2, the name server N of this embodiment has a reception unit 11 for receiving a reverse look-up request message, a transmission unit 12 for transmitting a response message for the reverse look-up request, a reverse look-up request processing unit 13 for processing the reverse look-up request, a reverse look-up table 14 in which the host name is registered by using the IPv6 address as a key, and a host name generation unit 15 for generating a pseudo (or provisional) host name according to the IPv6 address as will be described in detail below. Note that the necessary information such as the reverse look-up table, etc., is stored in an appropriate memory device. Also, in FIG. 2, a communication interface for making a connection to the subnet to which the communication node is connected, and communication interfaces for making connections to channels connected to respective ISPs are omitted.

Note that this name server N can be realized by using a computer. Also, a part or all of the processing can be realized by a program, and a part or all of the processing can be realized by a dedicated semiconductor integrated circuit.

FIG. 3 shows an exemplary configuration of the name server M for managing the DNS normal look-up information according to one embodiment of the present invention.

As shows in FIG. 3, the name server M of this embodiment has a reception unit 21 for receiving a normal look-up request message, a transmission unit 22 for transmitting a response message for the normal look-up request, a normal look-up request processing unit 23 for processing the normal look-up request, a normal look-up table 24 in which the IPv6 address is registered by using host name as a key, and an IP address generation unit 25 for generating a pseudo (or provisional) IPv6 address according to the host name as will be described in detail below. Note that the necessary information such as the normal look-up table, etc., is stored in an appropriate memory device. Also, in FIG. 3, a communication interface for making a connection to the subnet to which the communication node is connected, and communication interfaces for making connections to channels connected to respective ISPs are omitted.

Note that this name server M can be realized by using a computer. Also, a part or all of the processing can be realized by a program, and a part or all of the processing can be realized by a dedicated semiconductor integrated circuit.

Figure 4:
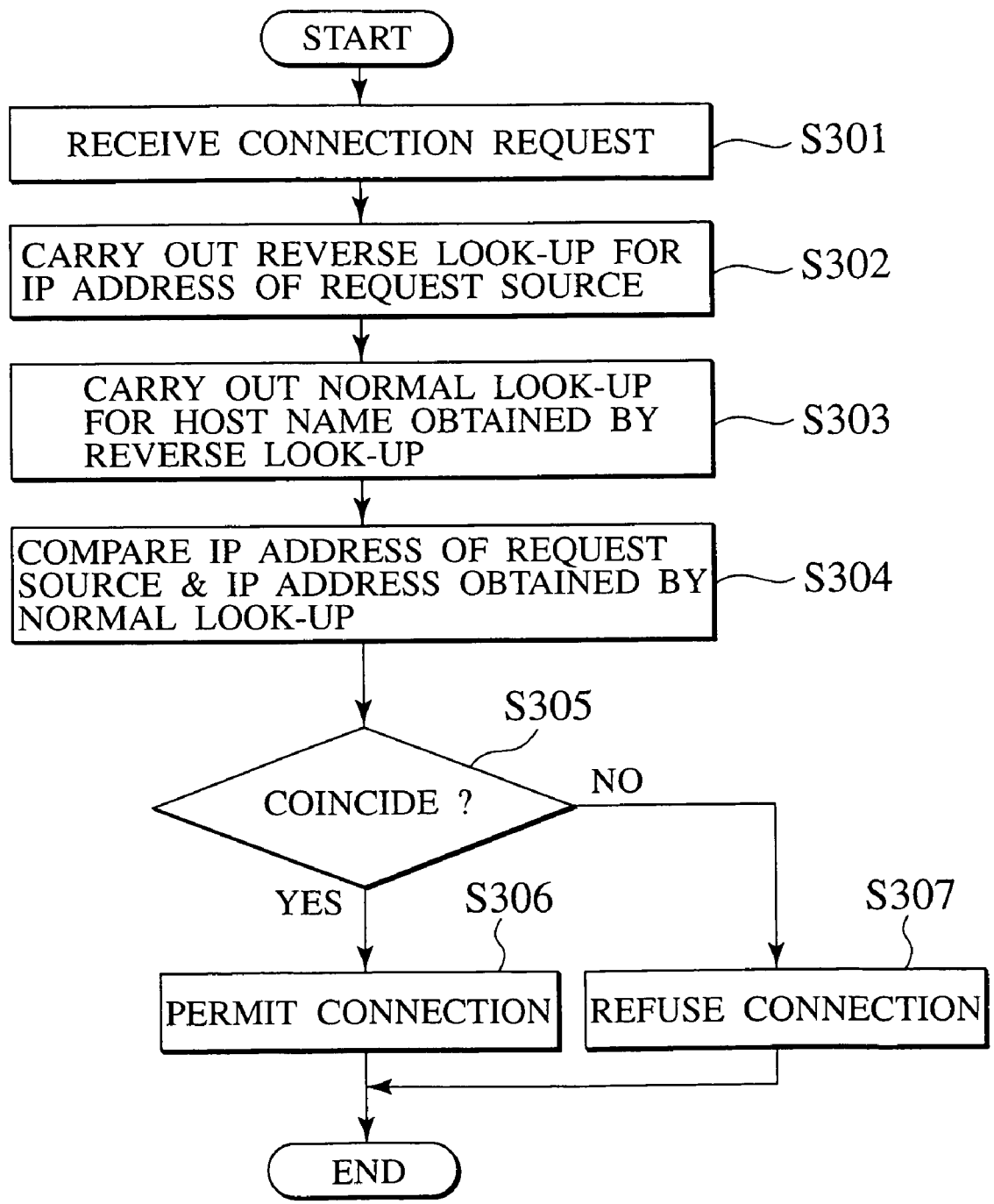
FIG. 4 is a flow chart showing one exemplary processing procedure of an FTP server according to one embodiment of the present invention.

Next, FIG. 4 shows an exemplary processing procedure of the FTP server F. Here, the FTP server F is assumed to be carrying out the access control by utilizing both the reverse look-up and the normal look-up.

When a connection request is received (step S301), the FTP server F carries out the reverse look-up for the IPv6 address of the request source (the host H in this example) (that is, a source address of a received packet first (step S302), and then carries out the normal look-up for the host name obtained by the reverse look-up (step S303). Then, the IPv6 address of the request source and the IPv6 obtained by the normal look-up are compared (step S304), and if they coincide (step S305 YES), the connection of the request source is permitted (step S306), whereas if they do not coincide (step S305 NO), the connection of the request source is refused (step S306). Note that When an error is returned by the reverse look-up, the connection is refused without carrying out the normal look-up, and if an error is returned by the normal look-up, the connection is also refused.

Next, FIG. 5 shows an exemplary processing procedure of the name server N for the reverse look-up in this embodiment.

When the reverse look-up request is received (step S1), the name server N searches through the reverse look-up table for the host name corresponding to the requested IPv6 address, by using the requested IPv6 address as a key (step S2).

Then, if the corresponding host name is obtained (step S3 YES), a response indicating the obtained host name is returned to the request source (the FTP server F in this example) (step S4).

On the other hand, if the corresponding host name is not obtained (step S3 NO), the pseudo host name is generated (step S5), and a response indicating the generated host name is returned to the request source (step S6).

Note that, at the step S6, if the pseudo host name cannot be generated for some reason, an error will be returned to the request source.

Here, in generating the pseudo host name, the name server N generates a host name that is in one-to-one correspondence with that IPv6 address, by using a prescribed method, on a basis of the IPv6 address related to the reverse look-up request. Also, the pseudo host name contains information indicating that this host name is the pseudo host name (rather than the ordinary host name) in a part of that pseudo host name.

Also, the generation of the host name from the IPv6 address by this name server N and the generation of the IPv6 address from the host name by the name server M described next are set up in advance to have a relationship of being an inverse conversion of each other.

Figure 6:
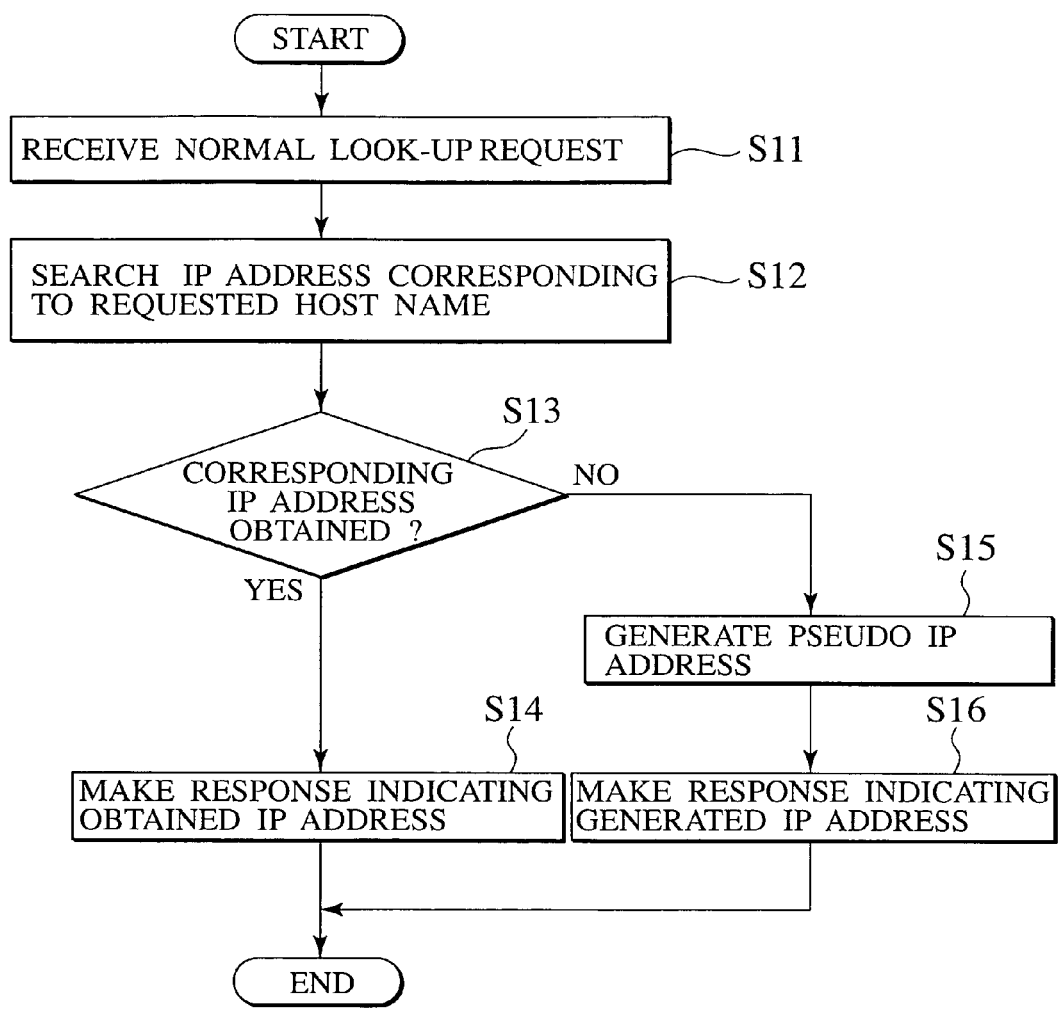
FIG. 6 is a flow chart showing one exemplary processing procedure of a name server for normal look-up according to one embodiment of the present invention.

Next, FIG. 6 shows an exemplary processing procedure of the name server M for the normal look-up in this embodiment.

When the normal look-up request is received (step S11), the name server M searches through the normal look-up table for the IPv6 address corresponding to the requested host name, by using the requested host name as a key (step S12).

Then, if the corresponding IPv6 address is obtained (step S13 YES), a response indicating the obtained IPv6 address is returned to the request source (the FTP server F in this example) (step S14).

On the other hand, if the corresponding IPv6 address is not obtained (step S13 NO), the pseudo IPv6 address is generated (step S15), and a response indicating the generated IPv6 address is returned to the request source (step S16).

Note that, at the step S16, if the pseudo IPv6 address cannot be generated for some reason, an error will be returned to the request source.

Also, in the above procedure, when it is judged that the corresponding IPv6 address is not obtained at the step S13, the pseudo IPv6 address is generated at the step S15, but instead of that, it is also possible to judge whether the host name related to the normal look-up request is the pseudo host name or not such that if it is the pseudo host name, the IP address is generated, whereas if it is not the pseudo host name, the normal look-up table is searched through.

Here, in generating the pseudo IPv6 address, the name server M generates an IPv6 address that is in one-to-one correspondence with that host name, by using a prescribed method, on a basis of the host name elated to the normal look-up request.

Also, as mentioned above, the generation of the IPv6 address from the host name by this name server M and the generation of the host name from the IPv6 address by the name server N described earlier are set up in advance to have a relationship of being an inverse conversion of each other.

There are many variations possible for the host name generation by the name server N and the IPv6 address generation by the name server M which are in a relationship of being an inverse conversion of each other.

For example, the name server N can generate the host name by attaching a specific character string containing a character string that indicates the pseudo host name (or a character string according to a specific format) with respect to the IPv6 address, and the name server M can generate the IPv6 address by deleting the specific character string containing the character string that indicates the pseudo host name (or the character string according to the specific format) from the host name (containing the character string that indicates the pseudo host name), and extracting the original IPv6 address.

It is also possible to provide plural sets of the host name generation procedure for the name server N and the IPv6 address generation procedure for the name server M which are in a relationship of being an inverse conversion of each other and assign an identification information to each set, such that the name server N selects one suitable set from the plural sets of procedures at a time of the host name generation and generates the host name according to the host name generation procedure according to the selected set of procedures, and attaches the identification information indicating the selected set of procedures containing the host name generation procedure used in generating that host name as a part of the generated host name. Then, the name server M can select the one set of procedures from the plural sets of procedures according to the identification information contained in the pseudo host name related to the request at a time of the IPv6 address generation, and generate the IPv6 address according to the IPv6 address generation procedure according to the selected set of procedures.

Figure 7:
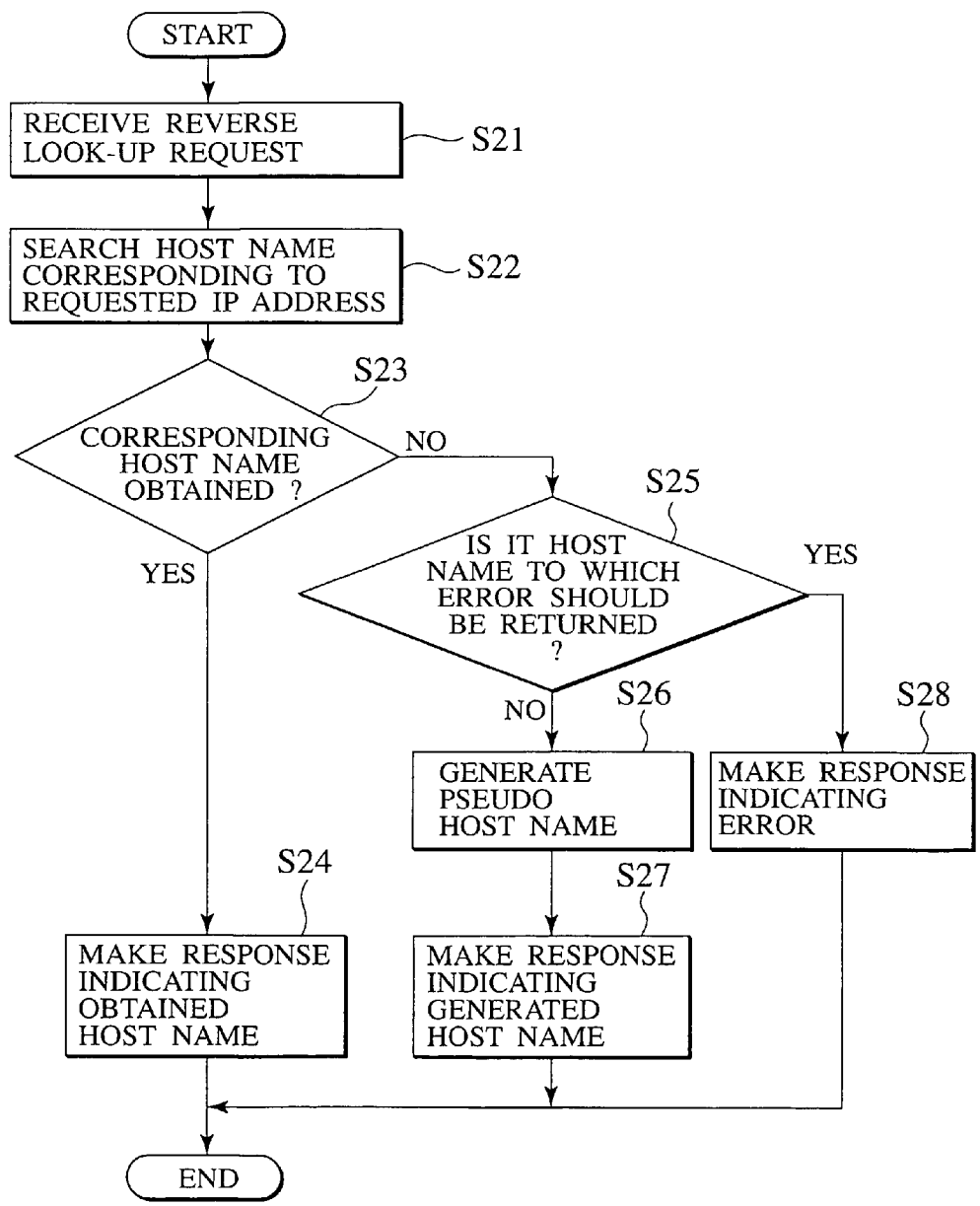
FIG. 7 is a flow chart showing another exemplary processing procedure of a name server for reverse look-up according to one embodiment of the present invention.

Now, in the exemplary procedure of the name server N for the reverse look-up shown in FIG. 5, the pseudo host name is generated whenever the host name corresponding to the requested IPv6 address is not obtained as a result of searching through the table, but instead of that, it is also possible to generate the pseudo host name only when a prescribed condition is satisfied and return an error otherwise. FIG. 7 shows an exemplary processing procedure of the name server N in this case.

The prescribed condition can be a condition to generate the pseudo host name in the case where the requested IPv6 address is not any one of addresses registered in advance for returning an error, or a condition for generating the pseudo host name in the case where a prescribed number of upper bits of the requested IPv6 address do not coincide with a value registered in advance, for example. Conversely, it is also possible to use a condition for generating the pseudo host name in the where the requested IPv6 address is one of addresses registered in advance or in the case where a prescribed number of upper bits of the requested IPv6 address coincide with a value registered in advance.

Figure 8:
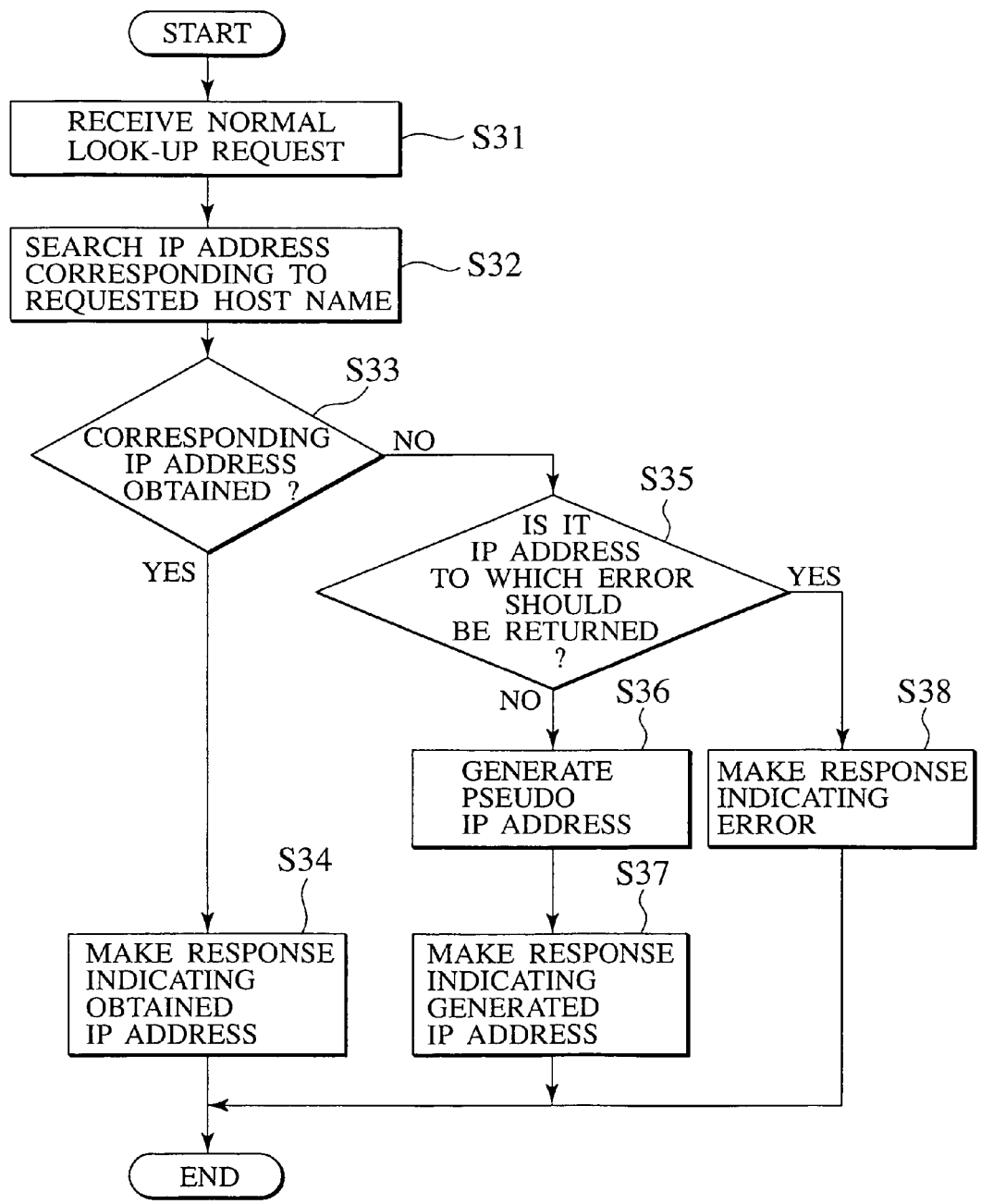
FIG. 8 is a flow chart showing another exemplary processing procedure of a name server for normal look-up according to one embodiment of the present invention.

Similarly, in the exemplary procedure of the name server M for the normal look-up shown in FIG. 6, the pseudo IPv6 address is generated whenever the IPv6 address corresponding to the requested host name is not obtained as a result of searching through the table, but instead of that, it is also possible to generate the pseudo IPv6 address only when a prescribed condition is satisfied and return an error otherwise. FIG. 8 shows an exemplary processing procedure of the name server M in this case.

Note that, in the above procedure, when it is judged that the corresponding IPv6 address is not obtained at the step S33, the processing proceeds to the step S35 and on, but instead of that, it is also possible to judge whether the host name related to the normal look-up request is the pseudo host name or not such that if it is the pseudo host name, the processing proceeds to the step S35 and on, whereas if it is not the pseudo host name, the normal look-up table is searched through.

The prescribed condition can be a condition to generate the pseudo IPv6 address in the case where the requested host name is not any one of host names registered in advance for returning an error, or a condition for generating the pseudo IPv6 address in the case where a prescribed portion of the requested host name does not coincide with a value registered in advance, for example. Conversely, it is also possible to use a condition for generating the pseudo IPv6 address in the where the requested host name is one of host names registered in advance or in the case where a prescribed portion of the requested host name coincides with a value registered in advance.

Also, when the name server N generates the pseudo host name, the name server N can judge whether or not the pseudo host name is to be generated according to the condition as described above, and if it is judged that the pseudo host name is not to be generated, the name server N generates the pseudo host name and attaches information indicating that this host name is the pseudo host name and information indicating that an error should be returned to the normal look-up request at the name server M as a part of that pseudo host name. Then, the name server M can return an error to the request source when the pseudo host name related to the request contains information indicating that an error should be returned as a part of it. It is also possible to attach information indicating that the IPv6 address should be generated when it is judged that the pseudo host name is not to be generated, and it is also possible to generate the IPv6 address when information indicating that an error should be returned is not attached.

It is also possible to generate the IPv6 address from the pseudo host name related to the normal look-up request once, and make a judgement for the generated IPv6 address according to the condition similar to the above described case of the name server N.

Note that the procedure of FIG. 7 and the procedure of FIG. 8 may be carried out simultaneously, or only either one of them may be carried out, such that the procedure of FIG. 5 and the procedure of FIG. 8 alone will be carried out or the procedure of FIG. 7 and the procedure of FIG. 6 alone will be carried out.

In the following, the overall operation of the system of this embodiment will be described in detail.

Figure 14:
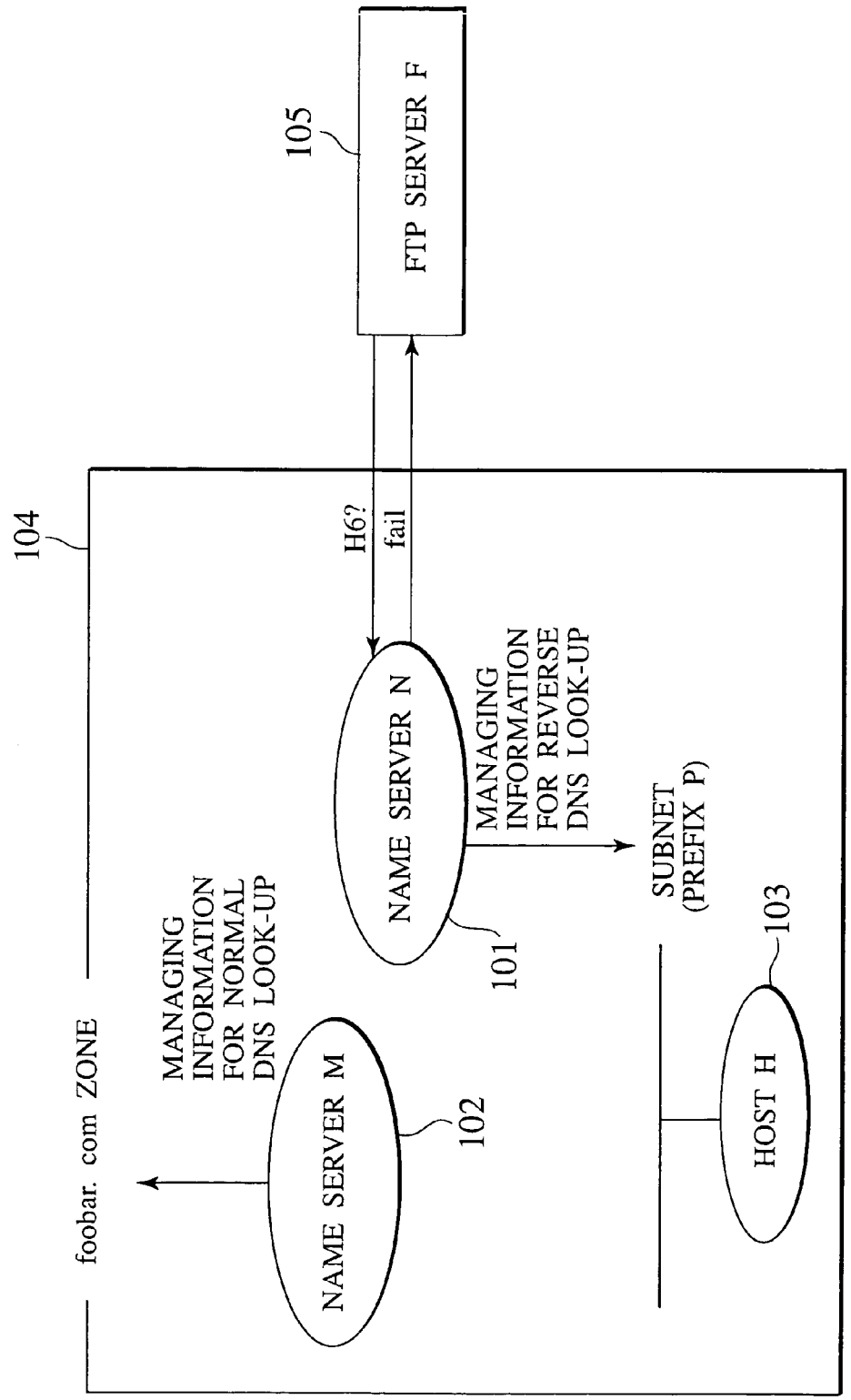
FIG. 14 is a schematic diagram showing a configuration of a conventional network system.
Figure 15:
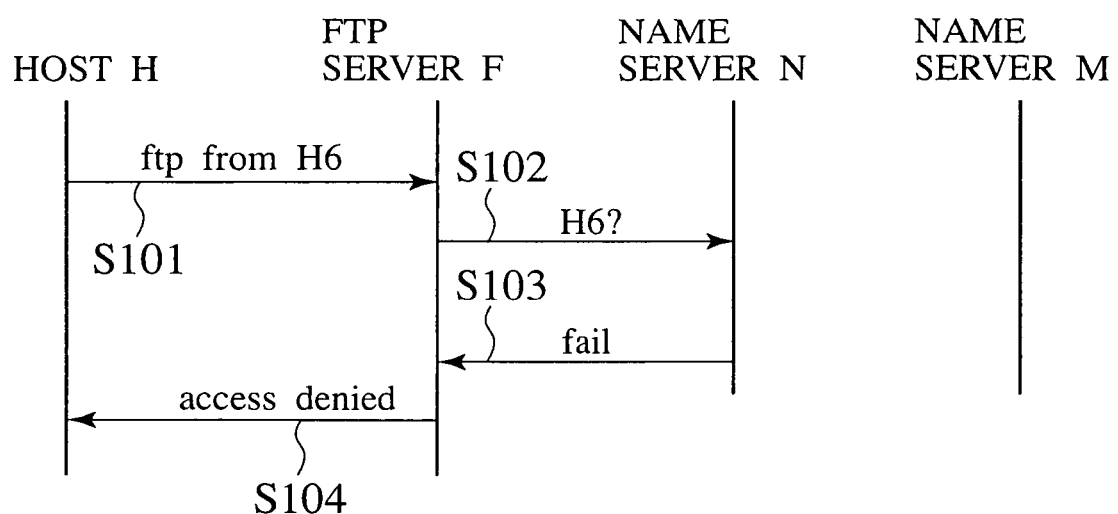
FIG. 15 is a sequence chart showing an exemplary sequence in the conventional network system.

Here, before describing the overall operation of the system of this embodiment, the case where the FTP server F fails the authentication and the connection is refused in a conventional network system will be described with references to FIG. 14 and FIG. 15. FIG. 14 shows a configuration of a conventional network system, and FIG. 15 shows a sequence in the case where a host 103 attempts a connection by ftp to an FTP server 105 in the conventional network system.

Here, the exemplary case where the host 103 carries out communications with the FTP server 105 located outside the "foobar.com" zone will be described.

It is assumed that the FTP server 105 utilizes the reverse look-up and the normal look-up as in FIG. 4 as the authentication (or a part of the authentication) of the correspondent and permits the connection from that host when the authentication succeeds.

First, the host 103 attempts an ftp connection to the FTP server 105 (step S101).

The FTP server 105 can ascertain the IPv6 address "3ffe:ffff:1234:abcd:7550:f6b8:7d9d:ad7f" of the host 103 at the initial stage of the connection set up.

Next, the FTP server 105 sends an inquiry to the name server 101 (directly or via a nearby cache server), in an attempt to obtain the RR corresponding to this address "3ffe:ffff:1234:abcd:7550:f6b8:7d9d:ad7f" (step S102).

Here, the RR corresponding to this address is not registered in the name server 101, so that the name server 101 returns a negative response to the FTP server 105 (step S103).

As a result, the FTP server 105 refuses the connection request from the host 103 (step S104).

Note that it is also possible to use the FTP server 105 that utilizes only the reverse look-up (in such a way that the reverse look-up is regarded as success when some host name is returned from the name server in response to the reverse look-up request), and even in this case, when a negative response is returned from the name server 101, the connection request from the host 103 is refused similarly as in the above.

Next, the case where the name servers N and M of this embodiment makes responses will be described.

Here, the exemplary case where the host H carries out communications with the FTP server F located outside the "foobar.com" zone will be described.

It is assumed that the FTP server F utilizes the reverse look-up and the normal look-up as in FIG. 4 as the authentication (or a part of the authentication) of the correspondent and permits the connection from that host when the authentication succeeds.

Figure 9:
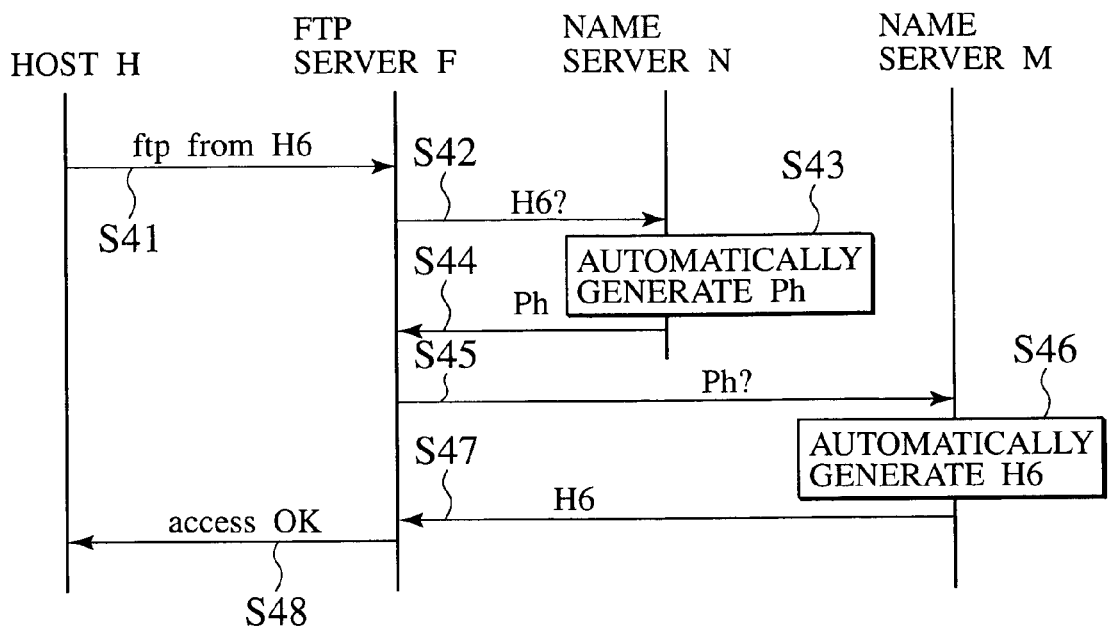
FIG. 9 is a sequence chart showing one exemplary sequence in the network system according to one embodiment of the present invention.

FIG. 9 shows an exemplary sequence in the case where the host H attempts a connection by ftp to the FTP server F.

First, the host H attempts an ftp connection to the FTP server F (transmits a connection request) (step S41).

The FTP server F can ascertain the IPv6 address "3ffe:ffff:1234:abcd:7550:f6b8:7d9d:ad7f" (which will be abbreviated as H6 hereafter) of the host H at the initial stage of the connection set up.

Next, the FTP server F sends an inquiry for the address H6 to the name server N (directly or via a nearby cache server), in an attempt to obtain the RR corresponding to this address H6 (step S42).

When the inquiry for the reverse look-up information is received (step S42), the name server N searches through the database (the reverse look-up table of FIG. 2) of the corresponding zone first. At this point, the corresponding RR does not exist (it is assumed that the corresponding RR is not registered here), so that this search fails.

In this case, the name server N automatically generates the pseudo host name that is in one-to-one correspondence with the inquired IPv6 address H6 dynamically (step S43), and returns it as a success response (step S44).

Here, it is assumed that the name server N generates the host name in one-to-one correspondence by the method of attaching "pseudohost" at a head of the inquired IPv6 address, and attaching "foobar.com" at a tail of the inquired IPv6 address. In this example, the IPv6 address is "3ffe:ffff:1234:abcd:7550:f6b8:7d9d:ad7f", and it is assumed that "pseudohost3ffe-ffff-1234-abcd-7550-f6b8-7d9d-ad7f.foobar.com" (which will be abbreviated as Ph hereafter) is generated as the host name in one-to-one correspondence with this address. Here, the method to replace ":" by "-" is used, but this is not essential and any other method can be used.

Upon receiving this response (step S44), the FTP server F searches for AAAA RR corresponding to the host name Ph next, in order to check the consistency of the obtained host name Ph and the IPv6 address utilized for a connection (step S45).

The inquiry based on this search is handled by the name server M that manages the DNS normal look-up information of the "foobar.com" zone (step S45).

The name server M searches through the database (the normal look-up table of FIG. 3) of this zone first, but this host name is dynamically generated one so that it is not registered in the database, and this search fails. Then, the name server M obtains the IPv6 address H6 next by carrying out the processing which is in the inverse conversion relationship with the name server N which is set up in advance (step S46), and returns a response indicating this address as AAAA RR (step S47).

Here, it is assumed that the name server M generates the IPv6 in one-to-one correspondence by the method of deleting "pseudohost" from a head of the inquired pseudo host name, and deleting "foobar.com" from a tail of the inquired pseudo host name. In this example, the IPv6 address is pseudo host name is "pseudohost3ffe-ffff-1234-abcd-7550-f6b8-7d9d-ad7f.foobar.com", and it is assumed that "3ffe:ffff:1234:abcd:7550:f6b8:7d9d:ad7f" is generated as the IPv6 address in one-to-one correspondence with this host name. Here, the method to replace "-" by ":" is used, but this is not essential and any other method can be used.

This address coincides with the address utilized in the ftp connection, so that the consistency check also succeeds, and this connection request is eventually accepted.

When the authentication succeeds in this way, the FTP server F permits the connection request of the host H (step S48).

Note that, in the case where the host H attempted a connection by ftp to the FTP server F, but the name server N returned an error in response to the reverse look-up request from the FTP server F so that the authentication fails and the FTP server F refuses the connection request of the host H, the sequence becomes similar to that shown in FIG. 15.

Figure 10:
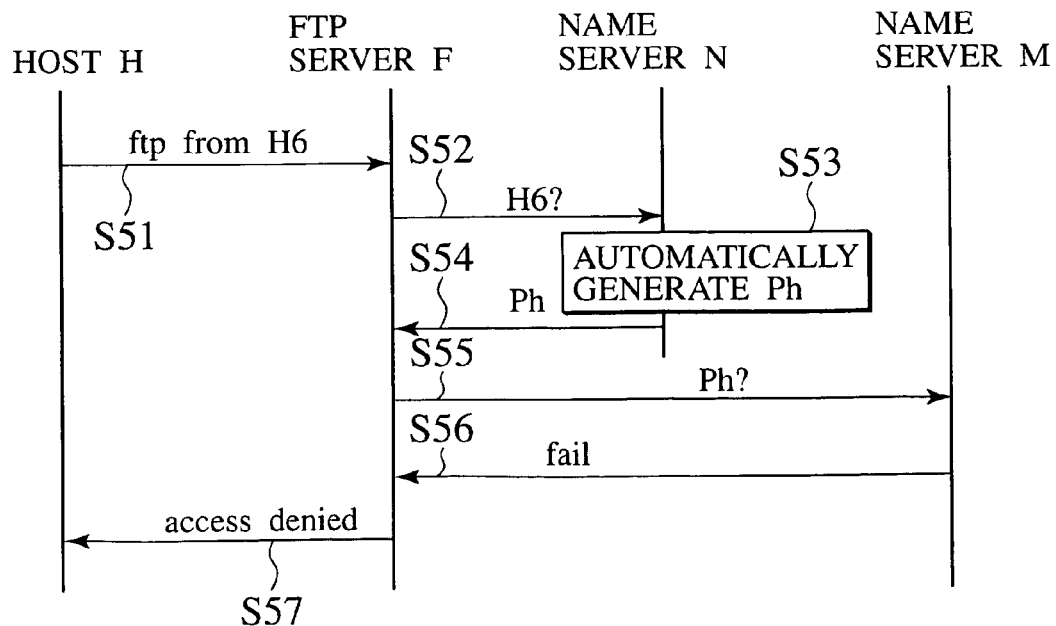
FIG. 10 is a sequence chart showing another exemplary sequence in the network system according to one embodiment of the present invention.

Also, in the case where the host H attempted a connection by ftp to the FTP server F and the name server N returned the pseudo host name in response to the reverse look-up request from the FTP server F, but but the name server M returned an error in response to the normal look-up request from the FTP server F so that the authentication fails and the FTP server F refuses the connection request of the host H, the sequence becomes as shown in FIG. 10.

Now, up to this point, the exemplary case where the FTP server F carries out the access control by utilizing both the reverse look-up and the normal look-up has been described. In the following, another exemplary case where the FTP server F carries out the access control by utilizing only the reverse look-up (in such a way that the reverse look-up is regarded as success when some host name is returned from the name server in response to the reverse look-up request) will be described.

Figure 12:
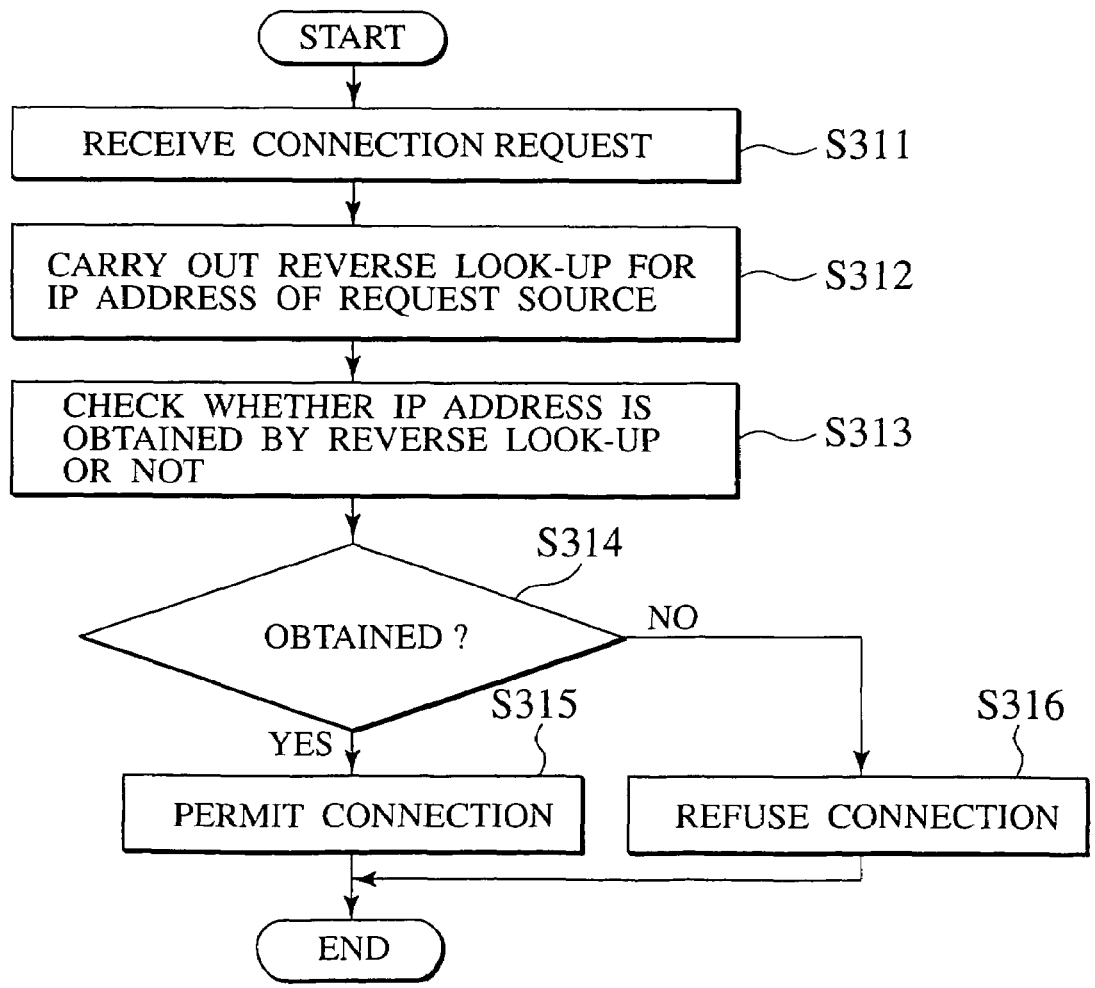
FIG. 12 is a flow chart showing another exemplary processing procedure of an FTP server according to one embodiment of the present invention.

FIG. 12 shown an exemplary processing procedure of the FTP server F in this case.

When a connection request is received (step S311), the FTP server F carries out the reverse look-up for the IPv6 address of the request source (the host H in this example) (that is, a source address of a received packet) first (step S312), and checks whether the IPv6 address is obtained by the reverse look-up or not (step S313). If the IPv6 address is obtained (step S314 YES), the connection of the request source is permitted (step S315), whereas if the IPv6 address is not obtained (step S314 NO), the connection of the request source is refused (step 316).

Here, the exemplary case where the host H carries out communications with the FTP server F located outside the "foobar.com" zone will be described.

Note here that it is possible to use the name server N and the name server M both of which have the function for generating the pseudo host name or the IPv6 address as described above (in which case the FTP server F as in FIG. 4 and the FTP server F as in FIG. 12 can coexist), or use the name server N which has the function for generating the pseudo host name as described above and the name server M which is similar to the conventional one (in which case it is assumed that only the FTP server F as in FIG. 12 exists).

Figure 11:
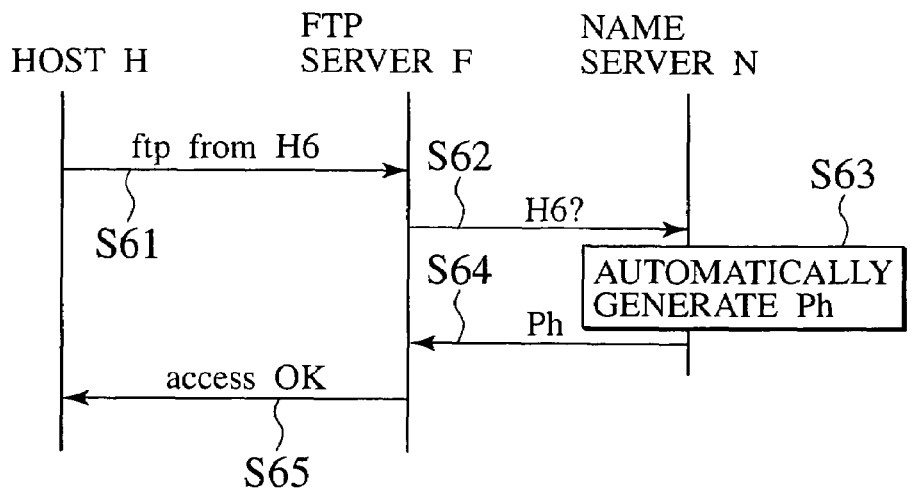
FIG. 11 is a sequence chart showing another exemplary sequence in the network system according to one embodiment of the present invention.

FIG. 11 shows an exemplary sequence in the case where the host H attempts a connection by ftp to the FTP server F.

First, the host H attempts an ftp connection to the FTP server F (step S61).

The FTP server F can ascertain the IPv6 address "3ffe:ffff:1234:abcd:7550:f6b8:7d9d:ad7f" (that is, H6) of the host H at the initial stage of the connection set up.

Next, the FTP server F sends an inquiry for the address H6 to the name server N (directly or via a nearby cache server), in an attempt to obtain the RR corresponding to this address H6 (step S62).

When the inquiry for the reverse look-up information is received (step S62), the name server N searches through the database (the reverse look-up table of FIG. 2) of the corresponding zone first. At this point, the corresponding RR does not exist (it is assumed that the corresponding RR is not registered here), so that this search fails.

In this case, the name server N automatically generates the pseudo host name that is in one-to-one correspondence with the inquired IPv6 address H6 dynamically (step S63), and returns it as a success response (step S64), similarly as in the earlier example.

Upon receiving this response (step S64), the FTP server F regards the search as success because some host name is returned in response to the inquiry, and this connection request is eventually accepted.

When the authentication succeeds in this way, the FTP server F permits the connection request of the host H (step S65).

Note that, in the case where the host H attempted a connection by ftp to the FTP server F, but the name server N returned an error in response to the reverse look-up request from the FTP server F so that the authentication fails and the FTP server F refuses the connection request of the host H, the sequence becomes similar to that shown in FIG. 15.

Now, in the case of supporting the FTP server F that utilizes both the reverse look-up and the normal look-up for the access control as in FIG. 4, it is necessary for the name server N to generate the host name in one-to-one correspondence with the IPv6 address as the pseudo host name to be dynamically generated and return it as a response (and it is necessary for the name server M to carry out the IPv6 address generation processing which is in the inverse conversion relationship with the host name generation processing of the name server N).

However, in the case of supporting the FTP server F that utilizes only the reverse look-up for the access control as in FIG. 12 (the case where only the name server N has the function for generating the pseudo host name and the name server M does not have the function for generating the pseudo IPv6 address), the FTP server F judges the search as success if there is a response of some host name in response to the reverse look-up request, so that it is no absolutely necessary for the name server N to generate the host name in one-to-one correspondence with the IPv6 address as the pseudo host name to be dynamically generated and return it as a response to the FTP server F. For example, the Name server N can generate the host name that has a multiple-to-one relationship with a plurality of IPv6 addresses and return it as a response. There is also a method to always return a fictitious host name provided in advance (or a suitably selected one of a plurality of fictitious host names provided in advance), because the answering the host name that is set in correspondence to the IPv6 address to the unspecified server may not be preferable in the case where the leakage of the privacy is disfavored intensely.

Now, up to this point, the case where the FTP server F carries out the access control by utilizing at least the reverse look-up has been described, but it is also possible to support the case where the FTP server F carries out the access control by utilizing only the normal look-up (in such a way that the normal look-up is regarded as success when some IPv6 address is returned from the name server in response to the normal look-up request). Note that, in this case, it is assumed that the FTP server F that carries out the access control by utilizing only the normal look-up exists.

Figure 13:
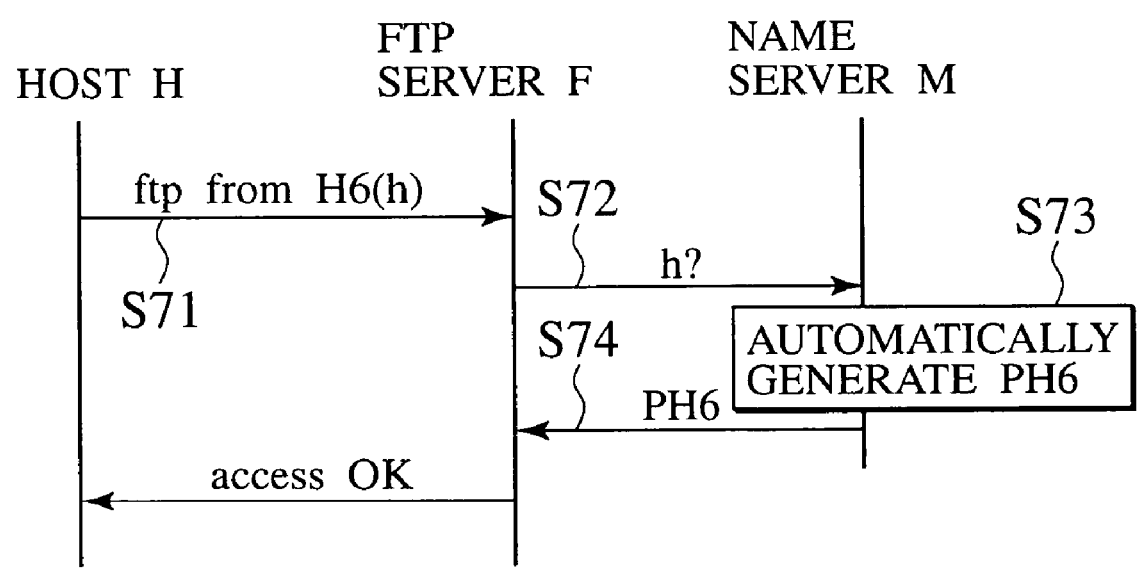
FIG. 13 is a sequence chart showing another exemplary sequence in the network system according to one embodiment of the present invention.

FIG. 13 shows an exemplary sequence in this case, in which the host H attempts a connection by ftp to the FTP server F.

First, the host H attempts an ftp connection to the FTP server F (step S71).

Note that, in this case, it is assumed that the FTP server F can ascertain the host name of the host H at the initial stage of the connection set up (the host name of the host is notified from the host H to the FTP server F at the initial stage of the connection set up, for example).

Next, the FTP server F sends an inquiry for the host name (which is assumed to be h here) to the name server M (directly or via a nearby cache server), in an attempt to obtain AAAA RR corresponding to this host name (step S72).

When the inquiry for the normal look-up information is received (step S72), the name server M searches through the database (the normal look-up table of FIG. 3) of the corresponding zone first. At this point, the corresponding AAAA RR does not exist (it is assumed that the corresponding AAAA RR is not registered here), so that this search fails.

In this case, the name server M automatically generates the pseudo IPv6 address (which is assumed to be PH6) dynamically (step S73), and returns it as a success response (step S74).

Upon receiving this response (step S74), the FTP server F regards the search as success because some IPv6 address is returned in response to the inquiry, and this connection request is eventually accepted.

When the authentication succeeds in this way, the FTP server F permits the connection request of the host H (step S75).

On the other hand, in the case where the host H attempted a connection by ftp to the FTP server F, but the name server M returned an error in response to the normal look-up request from the FTP server F, the authentication fails and the FTP server F refuses the connection request of the host H.

Note that, in this case, when the name server M generates the pseudo IPv6 address dynamically, it is possible to use one fictitious IPv6 address provided in advance (an address secured as one to be used only in a response as this fictitious IPv6 address, for example) as the pseudo IPv6 address to be generated, for example. It is also possible to use one fictitious IPv6 address which is suitably selected from a plurality of fictitious IPv6 addresses provided in advance (addresses secured as ones to be used only in a response as this fictitious IPv6 address, for example) as the pseudo IPv6 address to be generated, for example note that the host name and the pseudo IPv6 address can be in one-to-one correspondence, or in the multiple-to-one correspondence.

As described, according to the present invention, the host name to be used in responding to the reverse look-up request from the correspondent is generated at the name server side and returned as a response, so that the communications can be carried out without exposing the privacy of the communication host or the user to danger.

Also, according to the present invention, the IP address to be used in responding to the normal look-up request from the correspondent is generated at the name server side and returned as a response, so that the communications can be carried out without exposing the privacy of the communication host or the user to danger.

Also, according to the present invention, the host name to be used in responding to the reverse look-up request from the correspondent is generated at the name server side and returned as a response, while the IP address to be used in responding to the normal look-up request from the correspondent is generated at the name server side and returned as a response, and the consistency between the reverse look-up and the normal look-up is imposed, so that the communications can be carried out while protecting the privacy even in the case of the correspondent who is carrying out more stringent access control.

Thus, according to the present invention, it becomes possible to protect the privacy of the communication node and the user, and guarantee the connectivity even in the case where the response of the name server is utilized for the access control.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the name server of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for communication control in a network system containing a first name server for managing first correspondence information that registers a host name corresponding to an IP address by using the IP address as a key, with respect to communication nodes belonging to a network of a prescribed range, a second name server for managing second correspondence information that registers an IP address corresponding to a host name by using the host name as a key, with respect to the communication nodes belonging to the network of the prescribed range, a communication node belonging to the network of the prescribed range, and a correspondent node belonging to external of the network of the prescribed range which becomes a correspondent of the communication node, the method comprising:

transmitting a connection request from the communication node to the correspondent node;

receiving the connection request from the communication node at the correspondent node, and transmitting a reverse look-up request to which a host name corresponding to a specific IP address of the communication node should be returned, from the correspondent node to the first name server;

receiving the reverse look-up request to which a host name corresponding to the specific IP address should be returned, from the correspondent node at the first name server;

searching through the first correspondence information by using the specific IP address contained in the reverse look-up request as a key, at the first name server;

generating a pseudo host name including information indicating that the generated name is a pseudo host name in one-to-one correspondence with the specific IP address according to the specific IP address, when a host name corresponding to the specific IP address contained in the reverse look-up request is not obtained as a result of search, at the first name server;

returning the pseudo host name to the correspondent node from the first name server;

receiving the pseudo host name from the first name server at the correspondent node, and transmitting a normal look-up request to which an IP address corresponding to the pseudo host name should be returned, from the correspondent node to the second name server;

receiving the normal look-up request to which an IP address corresponding to the pseudo host name should be returned, from the correspondent node at the second name server;

searching through the second correspondence information by using the pseudo host name contained in the normal look-up request as a key, at the second name server;

generating a pseudo IP address in one-to-one correspondent with the pseudo host name according to the pseudo host name, when an IP address corresponding to the pseudo host name contained in the normal look-up request is not obtained as a result of search, at the second name server;

returning the pseudo IP address to the correspondent node from the second name server; and receiving the pseudo IP address from the second name server, comparing the pseudo IP address received from the second name server and the specific IP address of the communication node, and permitting the connection request of the communication node when the pseudo IP address received from the second name server and the specific IP address of the communication node coincide, or refusing the connection request of the communication node when the pseudo IP address received from the second name server and the specific IP address of the communication node do not coincide, at the correspondent node.

* * * * *